United States Patent
Heinz

(10) Patent No.: US 9,102,344 B2
(45) Date of Patent: Aug. 11, 2015

(54) JACK AND DOLLY ASSEMBLY AND SYSTEM

(71) Applicant: Richard N. Heinz, Gladstone, MI (US)

(72) Inventor: Richard N. Heinz, Gladstone, MI (US)

( * ) Notice: Subject to any disclaimer, the term of this patent is extended or adjusted under 35 U.S.C. 154(b) by 0 days.

(21) Appl. No.: 14/063,812

(22) Filed: Oct. 25, 2013

(65) Prior Publication Data

US 2014/0117634 A1 May 1, 2014

Related U.S. Application Data

(60) Provisional application No. 61/718,826, filed on Oct. 26, 2012.

(51) Int. Cl.
*B62B 3/02* (2006.01)

(52) U.S. Cl.
CPC ............. *B62B 3/02* (2013.01); *Y10T 74/18576* (2015.01)

(58) Field of Classification Search
CPC ....... B60B 29/002; B66F 5/02; B66F 7/0625; B62B 3/02
USPC .................................... 280/31, 79.4; 414/426
See application file for complete search history.

(56) References Cited

U.S. PATENT DOCUMENTS

| | | | | | |
|---|---|---|---|---|---|
| 2,357,633 | A | * | 9/1944 | Cowgill, Jr. | 414/427 |
| 4,692,082 | A | * | 9/1987 | Smith | 414/429 |
| 4,854,803 | A | * | 8/1989 | Coccaro | 414/429 |
| 5,112,070 | A | * | 5/1992 | Hahn | 280/79.4 |
| 6,789,994 | B2 | * | 9/2004 | Tortellier | 414/429 |
| D532,575 | S | * | 11/2006 | Oberg | D34/28 |
| 7,232,138 | B2 | * | 6/2007 | Shubert | 280/79.4 |
| 7,914,017 | B2 | * | 3/2011 | Setzer et al. | 280/47.29 |
| 2006/0045683 | A1 | * | 3/2006 | Huiming et al. | 414/426 |
| 2008/0101898 | A1 | * | 5/2008 | Hernandez | 414/426 |
| 2013/0134685 | A1 | * | 5/2013 | John | 280/79.4 |

* cited by examiner

*Primary Examiner* — John Walters
*Assistant Examiner* — Brian Swenson
(74) *Attorney, Agent, or Firm* — Scott H. Liberman

(57) ABSTRACT

A jack and dolly assembly and system including a shaft defining a longitudinal axis extending along the shaft and an interior hollow; a reversible drive mechanism at least partially positioned in the interior hollow of the shaft; a proximal arm removably securable to the shaft and substantially perpendicular to the longitudinal axis; a distal arm removably securable to the drive mechanism, the distal arm being spaced from and substantially parallel to the proximal arm; wherein the reversible drive mechanism is operable to move the distal arm along the shaft.

21 Claims, 10 Drawing Sheets

JACK AND DOLLY ASSEMBLY AND SYSTEM

CROSS REFERENCE TO RELATED APPLICATIONS

This application claims the benefit of U.S. Provisional Application Ser. No. 61/718,826, filed Oct. 26, 2012, the complete subject matter of which is incorporated herein by reference in its entirety.

FIELD OF THE INVENTION

The invention relates to a jack and dolly assembly for lifting the wheel(s) of a vehicle. More particularly, the invention relates to a modular jack and dolly assembly for the lifting and subsequent moving of a vehicle while suspended upon the jack and dolly assembly. The assembly allows for the vehicle to be moved about an infinite number of axes in a single plane.

BACKGROUND OF THE INVENTION

Dollies for lifting and moving vehicles are well known in the art. Commonly, wheel dollies are used in the industry across various settings including towing and vehicle recovery, and also in repair and mechanical shop venues. The dollies currently presented by the prior art are inconvenient for many reasons.

It is known in the art for lifting dollies to comprise two parallel arms that perform a pinching movement to effect the lifting of a vehicle wheel. Often, these arms are connected by means to effect the pinching. The prior art exemplifies such means as requiring inefficient modes of implementation. Known means include complicated mechanical structures to impart the pinching forces. These structures comprise the use of an excessive amount of mechanical parts, require frequent servicing, and are bulky and difficult to operate. Prior art devices also use greasy lubricants that leave not only themselves, but residual surfaces undesirable, dirty, and slippery.

Wheel dollies as taught in the prior art are often bulky, heavy, and difficult to transport and operate. It is well known in the art that four or more dollies are required to completely lift the wheels of a vehicle from the surface it rests upon. A shortcoming not expressed in the prior art is the ability for a towing professional to retrieve a vehicle parked in a parallel position and having vehicles positioned both to the front and rear.

In such a position, prior art dollies require the use of dollies in a 'left' and 'right' configuration to allow for placement of the dolly and subsequent actuation of the lifting mechanism. This required users to possess and transport multiple, permanent configurations of a dolly.

Another reoccurring experience is the position of a wheel such that the lifting mechanism cannot be accessed or easily actuated. Often the lifting mechanism is too complicated to easily and timely effect actuation. Other times the vehicle is positioned where the lifting mechanism cannot be positioned or accessed altogether. In all such situations, the dollies of the prior art require time consuming procedures. Frequently, the user finds themselves forced into maneuvering their bodies into undesirable positions while placing the dolly and operating the lifting mechanism. These circumstances lead to the frequent inability to properly and easily lift a wheel, and often lead to the misfortune of the jack and dolly assemblies being abandoned altogether.

Jack and dolly assemblies are also known to be used in vehicle manufacturing venues and in vehicle repair settings. In these and other circumstances, the ability to place all of the wheels of a vehicle onto a means allowing it to be moved about any direction in a single plane is desirable. The prior art provides various dolly assemblies allowing this type of vehicle movement and re-location. However, the dollies found in prior art lack the ability to allow a user in this setting to place and actuate the device with ease; complicated actuation mechanisms force users to struggle while attempting to lift the vehicle onto the assembly.

As such, there is a need in the art for a jack and dolly assembly having a simply mechanical structure that is lightweight and easy to use. There is a need for an assembly that is adaptable to the venue and environment presented, allowing for the user to timely adapt the apparatus to the given situation, while easily and efficiently actuating the lifting mechanism from any angle or position without being subject to uncomfortable and inoperable body positions.

These and other objects will be readily evident upon a study of the following specification and the accompanying drawing wherein:

SUMMARY OF THE INVENTION

Embodiments of the invention relate to a jack and dolly assembly for lifting the wheel(s) of a vehicle and allowing for subsequent movement of a vehicle, in any direction of a single plane. The assembly functions to lift the wheel of a vehicle off the ground by pinching the tire of a vehicle between two adjacent arms, one arm moving towards the other arm. The arms are actuated by a simple and novel gear mechanism.

The present jack and dolly assembly embodies a modular structure allowing for simple and quick reconfiguration of the lifting arms and gear mechanism. The gear mechanism is located about a main support shaft, the shaft having a longitudinal axis running adjacent to two lifting arms, a proximal arm and a distal arm. A reversible drive mechanism is located within the main support shaft, and is actuated by the gear mechanism. Caster wheels may be placed upon and extend adjacent to each lifting arm. The wheels may be located at each of the four ends of the lifting arms. Each lifting arm may include a roller sleeve placed thereon to allow for movement of a tire or wheel while the lifting means is actuated.

Embodiments enable a proximal arm to be removably attached to the main support shaft. A distal arm is removably attached to the opposite end of the shaft. A gear mechanism is secured to a proximal end of the shaft and cooperates with the drive mechanism residing inside of the shaft. The drive mechanism functions to impart a pinching force for moving the distal arm in a proximal direction with respect to the longitudinal axis of the shaft.

In one embodiment, the lifting arms may be secured to the shaft allowing for a left hand placement of both arms, with respect to the longitudinal axis.

In another embodiment, the lifting arms may be secured to the shaft allowing for a right hand placement of both arms, with respect to the longitudinal axis.

Further embodiments include a support shaft having a longitudinal axis, the shaft shaped in a cylindrical fashion or enjoying a four-sided configuration. A gear mechanism, which may be in the form of a gearbox, is secured to the shaft. The gear mechanism cooperates with a drive mechanism inside of the shaft.

The distal arm may be removably secured to a second moving shaft or tube. The moving shaft is placed with the main support shaft, about the same longitudinal axis, and cooperating with the drive mechanism. Depending in the embodiment employed, the second moving shaft enjoys the same shape as the main support shaft.

Embodiments of the present invention allow for placement of the gear mechanism about any side the main shaft. The gear mechanism is secured to the proximal end of the main shaft and configured to co-operate with the drive mechanism. When the lifting arms are removed from the shaft, rotation of the shaft and subsequent replacement of the lifting arms upon the shaft will allow for the gear mechanism to be located on any side of the shaft.

In another embodiment, the proximal arm enjoys means to allow for an adjustable position about the main shaft. This adjustable means allows for the proximal arm to be further adjusted and secured to the main support shaft subsequent to its placement into a right or left hand configuration with respect to the longitudinal axis of the support shaft.

Embodiments enable the drive mechanism to be actuated by the gear mechanism. The gear mechanism may be configured to interact and accept a hex, allen, or other type of fastener as is well known in the art. Such configurations will allow for a user to employ the means of an electronic or mechanical hand tool, such as a drill, to enable movement of the gear mechanism. Movement of the gear mechanism results in subsequent actuation of the drive mechanism, imparting the lifting function.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

Throughout the various figures, like reference numbers refer to like elements.

DETAILED DESCRIPTION OF PRESENTLY PREFERRED EMBODIMENTS

Figure 1:
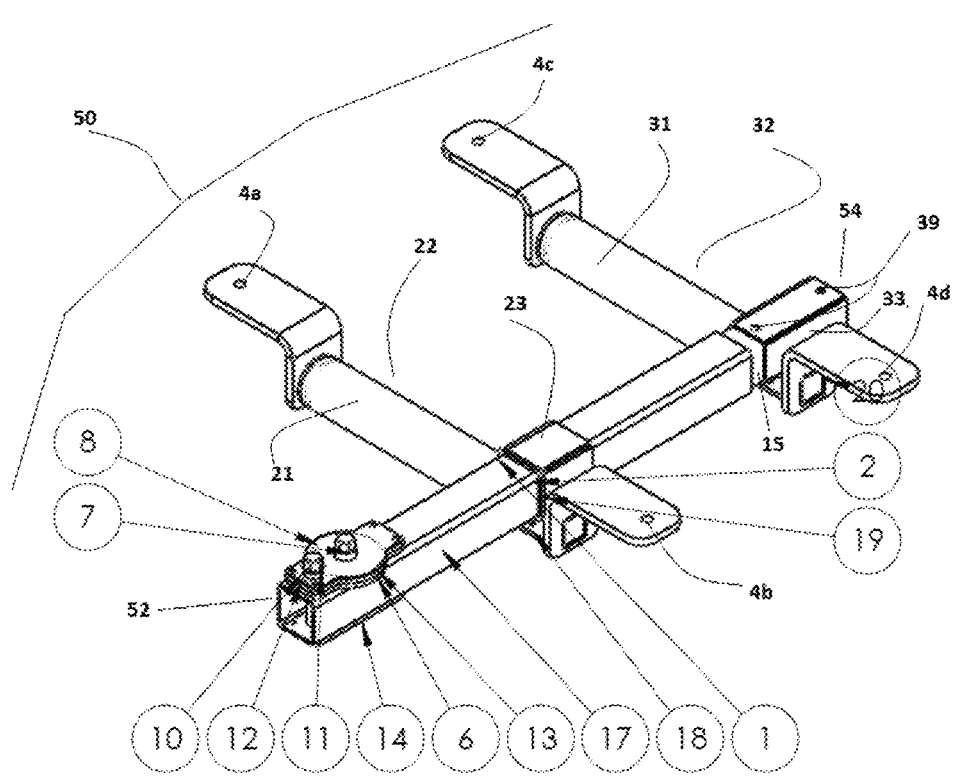
FIG. 1 is a perspective view of the jack and dolly assembly of the present invention.

Referring now to the drawings in greater detail, and more particularly to FIG. 1, a modular jack and dolly assembly 50 for lifting and moving vehicles in a fashion similar to that of a dolly.

Figure 2:
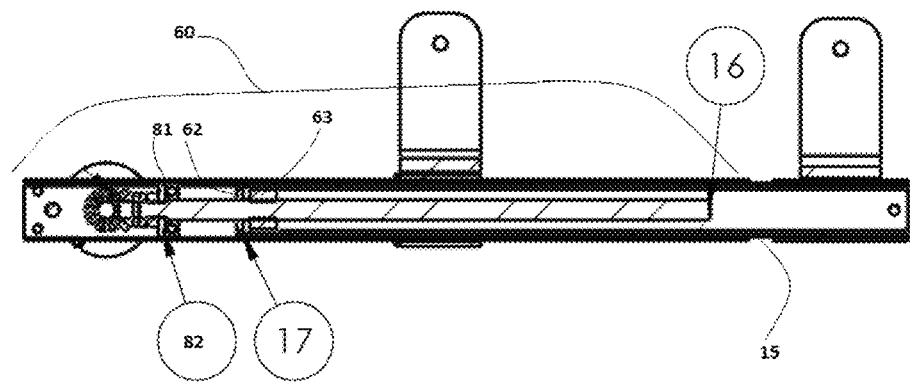
FIG. 2 is a top view of the support shaft and drive mechanism of the present invention.

In at least one embodiment the jack and dolly assembly 50 as shown in FIGS. 1 and 2 included is a main support shaft 17 having a longitudinal axis extending along the shaft from the proximal end 52 to the distal end 54. The shaft encloses drive mechanism 60. A proximal arm 22 is removably securable to the shaft 17. Proximal arm 22 is secured in an adjacent position to shaft 17. A distal arm 32 is removably secured to the drive mechanism 60, and is secured in a position adjacent to shaft 17. Proximal arm 22 and distal arm 32 are secured about shaft 17 such that both arms are extending in the same adjacent direction with respect to the longitudinal axis of the main shaft 17.

In one embodiment of the present invention, the jack and dolly assembly 50 is shown in FIGS. 1 and 2. Included is a main support shaft 17 having a longitudinal axis extending along the shaft from the proximal end 52 to the distal end 54. At the distal end of main shaft 17, a second moving shaft 15 is fit within the main shaft 17. In this configuration, the main shaft 17 acts as an outer tube that accepts a moving tube—the second moving shaft 15. The shafts may take on a variety of shapes, including round, square, rectangular, or other shapes. The choice of shaft shape must be uniform across the embodiments such that main shaft 17, moving shaft 15, and below described attaching means can all cooperate with each other.

The configuration shown in FIGS. 1 and 2 is one embodiment of the present invention. Main shaft 17 is an outer female shaft with respect to the inner male moving shaft 15. A reversible drive mechanism 60 is further contained within the main shaft 17 and the moving shaft 15. The drive mechanism serves to transfer force for translating the moving shaft 15 in a first forward-distal direction with respect to the longitudinal axis of main shaft 17. The drive mechanism 60 can also transfer a second, reversed force for translating the moving shaft 15 in a second-proximal direction with respect to the longitudinal axis of main shaft 17.

The force transferred by the drive mechanism is provided by a gear assembly 8. Gear assembly 8 is positioned and secured to the proximal end 52 of the main shaft 17. At this proximal location, the gear mechanism 8 interacts with drive mechanism 60 providing the drive mechanism with the energy required to translate shaft 15. The force translated to the moving shaft 15 provides the lifting forces offered by the assembly. The gear and drive mechanisms are described in further detail herein.

As described herein, the assembly 50 serves to lift one or more wheels of a vehicle (not shown). The gear mechanism 8, drive mechanism 60, main shaft 17, and inner moving shaft 15 serve to direct the force and translation required to operate the assembly. The assembly further includes two lifting arms that serve as contact points for the wheel or tire being lifted. The lifting arms transfer the force from the moving shaft 15 to a tire, and allow for the tire to remain suspended by the assembly.

Figure 8:
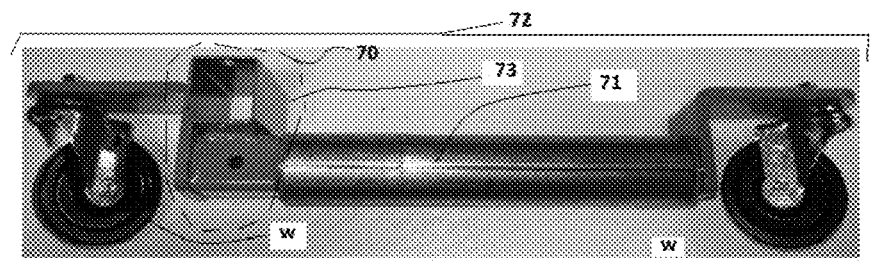
FIG. 8 is a side view of an assembled lifting arm of the present invention.
Figure 9:
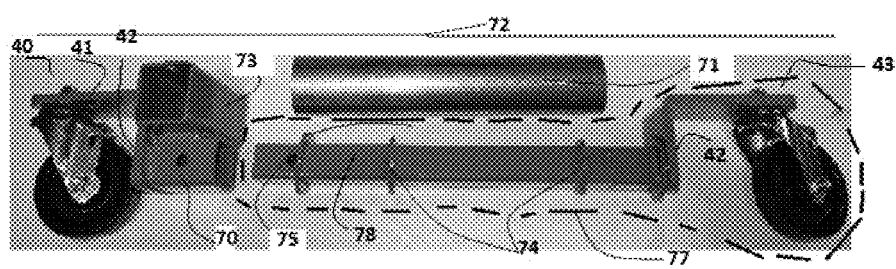
FIG. 9 is an exploded side view showing one embodiment of a lifting arm of the present invention.
Figure 10:
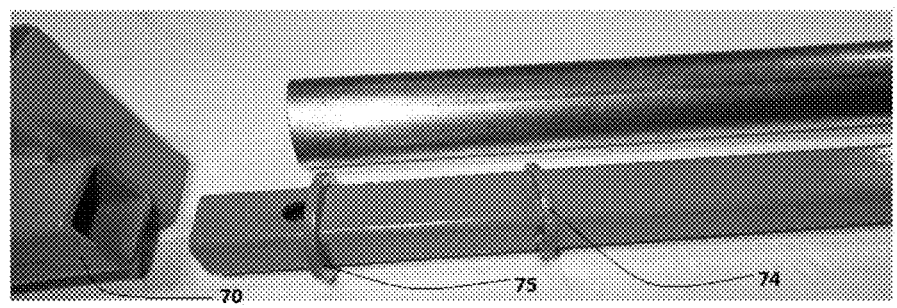
FIG. 10 is a alternative side view showing one embodiment of a lifting arm of the present invention.

Assembly 50 requires the use of two modular lifting arms. With reference to FIGS. 8, 9, and 10, one embodiment of a lifting arm 72 is shown. Lifting arm 72 is depicted as a modular assembly, allowing for reconfiguration and easy storage of the device. Lifting arm is comprised of an elongated central portion 78, two mounting brackets 41 & 42, and wheels W.

Each mounting bracket has a support mounting surface 41 and a center mounting surface 42. Elongated central portion 78 is positioned between the center mounting surfaces of the mounting brackets. The second end of the central portion is affixed to the second mounting bracket as defined in portion 77. The elongated central portion 78 also accepts the roller sleeve 71 thereon. Portion 77 is sized to fit within securing portion 70. Portion 77 is secured to portion 70 by insertion of a pin or bolt through the hole.

Sleeve 71 is fit about lifting arm 72, specifically about the longitudinal axis of portion 77, exemplified by FIGS. 8 and 9. Sleeve rests about friction reducing raceways 74. Raceways 74 allow for free rotation of the sleeve 71 while offering reduced friction for rotation of sleeve 71. Raceways 74 may also be in the form of sealed bearings. Alternatively, raceways 74 may also be in the form of a UMHD/Nylon insert, sized and shaped for a snug fit between roller sleeve 71 and portion 77.

Members 75 are fit about portion 77, sized and shaped to minimize and prevent movement of the sleeve with respect to the longitudinal axis of portion 77 and lifting arm 72.

Securing portion 70 also comprises shaft attaching means 73. Shaft attaching means 73 is sized and shaped to fit about the main shaft 17, or alternatively the moving shaft 15. Attaching means 73 is sized accordingly for each of the proximal and distal lifting arms, described below.

Figure 3:
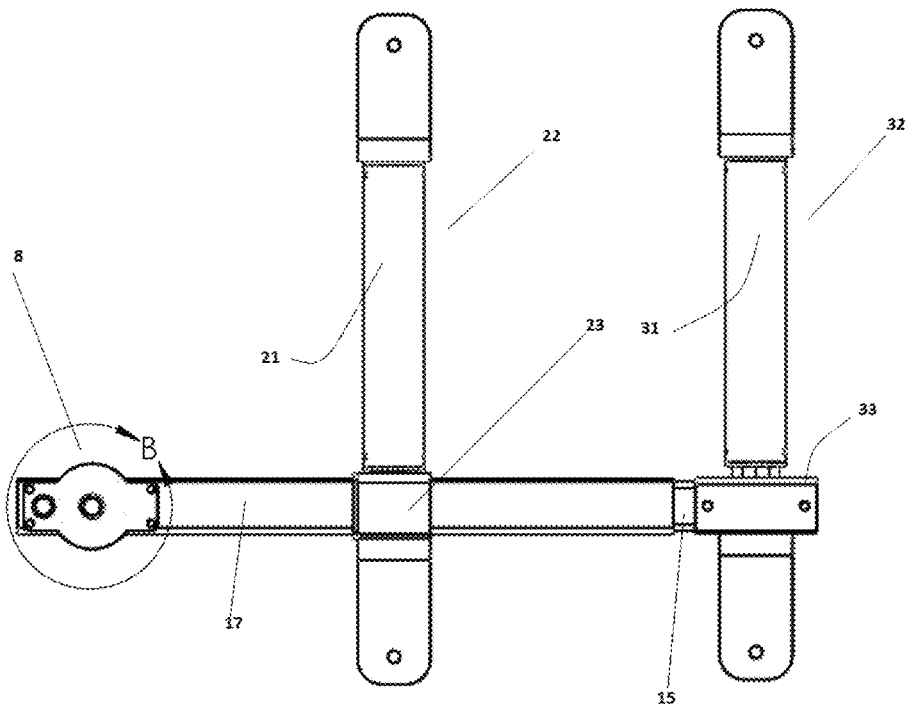
FIG. 3 is a top view of the jack and dolly assembly of the present invention.
Figure 4:
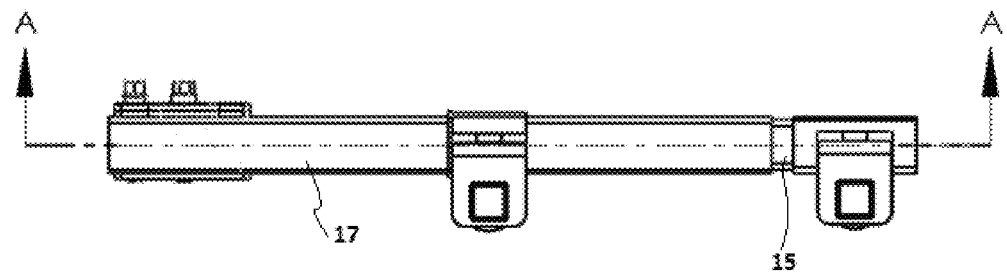
FIG. 4 is a side view of the longitudinal axis of the main support shaft of the present invention.
Figure 5:
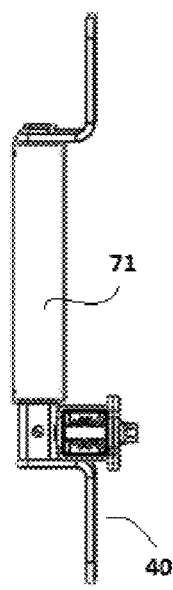
FIG. 5 is a side view of a lifting arm of the present invention.

Now referring to FIGS. 1 & 3, the lifting arms preferably include a proximal arm 22 and a distal arm 32. Both lifting arms are removably securable to the assembly. Proximal arm 22 is removably securable to the shaft 17. Proximal arm 22 is secured in a position adjacent to shaft 17 and remains stationary with respect to shaft 17 once securement is complete.

Proximal arm 22 is fit about main shaft 17. The proximal arm includes attaching means 23 sized and shaped to fit about and around the outer surface of shaft 17. Proximal arm 22, including attaching means 23 are secured to the main shaft 17 through various means.

Preferably, proximal arm 22 and attaching means 23 are secured to the shaft 17 through the use of an adjustable stop member 2. The adjustable stop member 2 serves to limit and prohibit any longitudinal translation of the proximal arm 22 about the main shaft 17. The stop member may take on various embodiments. The stop member may be comprised of an annular collar formed of a flexible, elastomeric material sized and shaped to fit around the main shaft, whereby an interference fit is created between the shaft 17 and attaching means 23, thereby inhibiting further translation of the arm 22 about the shaft 17. The stop member as described above may alternatively be in the form of an annular collar and comprised of various materials used to create friction and impart an interference fit as is known in the art. The stop member may also take on a mechanical configuration having means used to tighten a separate member about the main shaft 17, or to tighten attaching means 23 to the shaft 17 without additional parts or collars disposed about the shaft. In alternative embodiments, the stop member is a permanently affixed means such as a raised weld or other raised surface prohibiting proximal-direction movement of attaching means 23.

Other securement means for securing proximal arm 22 to shaft 17 may include the use of a bolt or pin. In such an embodiment, a pin or bolt is inserted through holes (not shown) in the attaching means 23 and shaft 17. The holes may include an internal thread for advanced securement of a bolt to the shaft 17. With the use of a pin or bolt, it is imperative that the placement of the holes and pin must not impede or interfere with the drive mechanism 60.

As shown in FIG. 1, there is also provided a distal arm 32. Distal arm 32 is removably secured to moving shaft 15, and is secured in a position adjacent to shaft 17. Distal arm includes attaching means 33. Attaching means 33 are sized and shaped to fit about the distal end of moving shaft 15. Attaching means 33 slides over distal end of moving shaft 15 and is secured to the moving shaft. Means for securing the distal arm 32 to moving shaft 15 preferably include pins 39. Pins 39 may have a flattened head and extend through holes in the distal arm and moving shaft assemblies. Holes (not shown) are included upon all sides of the distal end of the moving shaft. Tips of the pins 39 may also include means for securing the pins while preventing pins from backing out, such as a cotter-pin. Bolts may be used as an alternative to pins. The holes for receiving the pins may include threads for receiving a threaded bolt or pin, providing for alternative securement means of the distal arm 32 to the moving shaft 15.

Proximal arm 22 and distal arm 32 may each be equipped roller sleeves 21 and 31. Roller sleeves 21 and 31 are cylindrical shapes sleeves sized, shaped, and fitted about the longitudinal axis of the lifting arms, including the fiction reducing raceways described above. The roller sleeves 21 and 31 serve as skates to allow for free movement about the axis while the lifting of a wheel or tire is being performed by the jack and dolly assembly 50.

Drive mechanism 60 is detailed in FIG. 2. The drive mechanism 60 allows for translation of the moving sleeve 15 and the distal arm 32 with respect to the main shaft 17. In FIGS. 2, 3, 6, and 7 there is provided a gear assembly 8 and an acme threaded rod 16. The gear assembly is attached to the main shaft 17, preferably using bolts B. The gear assembly 8 drives the acme threaded rod 16, which transfers the lifting forces and allows for translation of the moving shaft 60.

Figure 7:
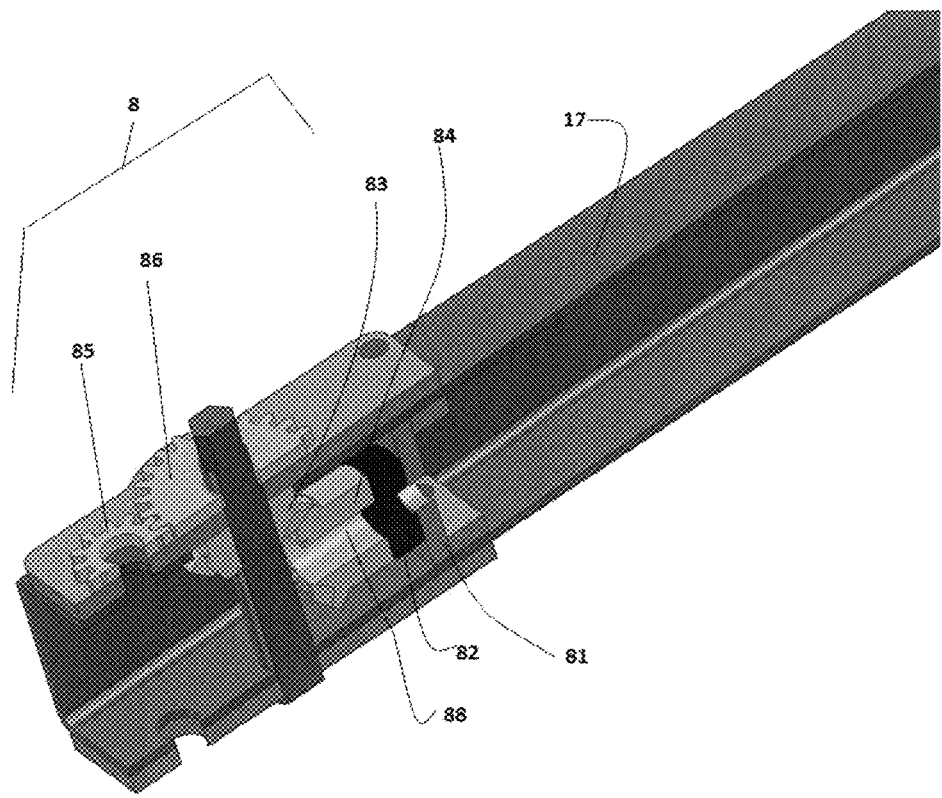
FIG. 7 is a cross section view of an internal gear mechanism of the present invention.

Now referring to FIGS. 2 & 7, acme threaded rod 16 co-operates with gear assembly 8. Acme threaded rod may be secured to gear mechanism at a location 88, shown in FIG. 7. Securing means for the acme rod may include the use of a set screw, a keyway, a pin, or other available means as in known in the art. Provided immediately distal to interaction of the gear and rod assemblies is a bearing 82. Bearing 82 rests against thrust plate 81. Thrust plate 81 serves to prevent acme threaded rod 16 from moving towards the gear assembly 8 and serves to allow for transfer of thrust and torque to acme threaded rod and moving shaft. Plate 81 is secured to main shaft 17 through the use of bolts. Alternatively, plate 81 may be secured to shaft 17 through a compression fit, whereby compression indents are made inwards upon shaft 17, such that compression indentations exist to the sides of plate 81, thereby holding the plate in place and preventing movement of the plate 81.

Exemplified in FIG. 2, in a position distal to gear assembly 8 and stop plate 81, acme threaded rod 16 interacts with moving shaft 15. This interaction allows for transfer of the forces from the acme rod to the moving shaft. Such means may include the use of a nut 63 as shown in FIG. 2. Optionally a second plate may be secured to nut 63, the plate further secured to shaft 15 by using a weld, or alternatively secured in a fashion similar to the thrust plate described above. In other embodiments, the plate may simply comprise a threaded through hole, the plate being secured to moving shaft 15 in any of the means described above.

With reference to FIGS. 1, 2, 6, and 7 gear mechanism 8 embodies a series of gear assemblies. Bevel gears 85, 86 are utilized to allow for maximum torque. A smaller gear 85 and a larger gear 86 are each provided. The larger bevel gear 86 providing high-speed & low-torque, and the smaller bevel gear 85 providing low-speed & high-torque. Each gear may be actuated individually.

Bevel gears 85, 86 provide the turning forces to turn miter gears 83 and 84. Specifically, bevel gear 86 is configured to transfer the horizontal forces to miter gear 83. Miter gear 83 subsequently turns and interacts with miter gear 84, transferring the horizontal forces into the required vertical forces. Miter gear 84, provides and transfers the force to the reminder of the drive assembly 60. The gear reduction described above allows for maximum torque to be achieved, thereby providing lifting forces necessary for heavy lifting of vehicles.

Figure 6:
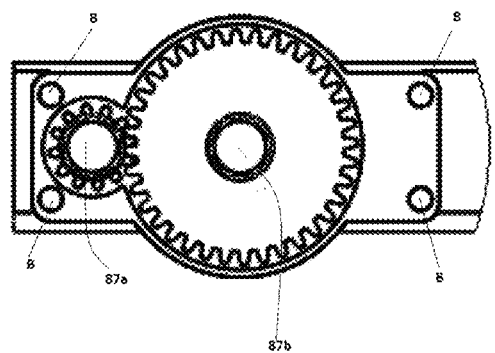
FIG. 6 is a top view of the gear mechanism of the present invention.

Gear assembly 8 also includes actuation means to provide the lifting forces required. Actuation means 87a, 87b allow for connection of a tool and transmission of torque from a torque providing device. As seen in FIG. 6, two locations 87a, 87b are provided for the actuation means. Actuation locations 87a, 87b provide for low-speed and high-speed control, and may take on various shapes, sizes and forms. Preferably, actuation means may be in the form of a hex screw, or traditional socket shape, allowing for easy connection with a portable electronic drill. Other forms may include allen-type sockets and other sockets shapes and sizes as is known to those skilled in the art. It is contemplated that the actuation means are activated through the use of a powered tool. For example, an electronic drill with a standard socket attached will provide the torque required to actuate the drive mechanism and impart the lifting function of the assembly.

Other mechanisms for providing torque may be contemplated. Such mechanisms may include means such as hand powered tools, cranks, or other torque providing tools as is known in the art. In a unique embodiment, a torque providing means is provided having a foot pedal. The foot pedal means connects to the gear mechanism via a socket as described above, and embodies a series of mechanisms which are actuated through depressing of a pedal attached to an elongated shaft. This means allows a user to impart manual torque force without the need for electronic driven tools.

With reference to FIGS. 1, 8, and 9, Wheels W are provided for the jack and dolly assembly. As shown in FIG. 1, wheels may be attached at locations 4a, 4b, 4c, & 4d. Wheels are preferably caster-type wheels and are attached extending in a direction adjacent to proximal and distal lifting arms. Wheels extend in a direction D such that wheels rest upon the ground when the assembly 50 is placed in an operating position.

With further reference to FIGS. 8 and 9, Wheels W are affixed to a first mounting bracket 40 and a second mounting bracket 43. Each mounting bracket comprises a support mounting surface 41, and a center mounting surface 42. The Wheels W are affixed the support mounting surface 41.

Materials used in the assembly of this device preferably include steel. Alternative materials may include the use of aluminum or other materials known to pride strength properties that are comparable to that of steel and aluminum.

Figure 11:
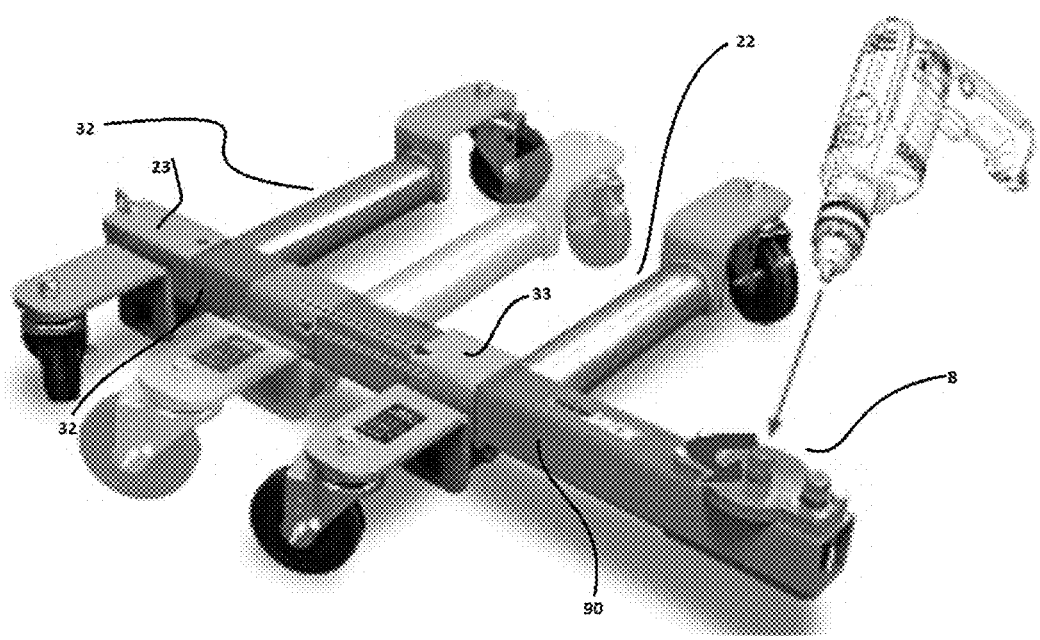
FIG. 11 is a perspective view showing one embodiment of the jack and dolly assembly of the present invention.
Figure 12:
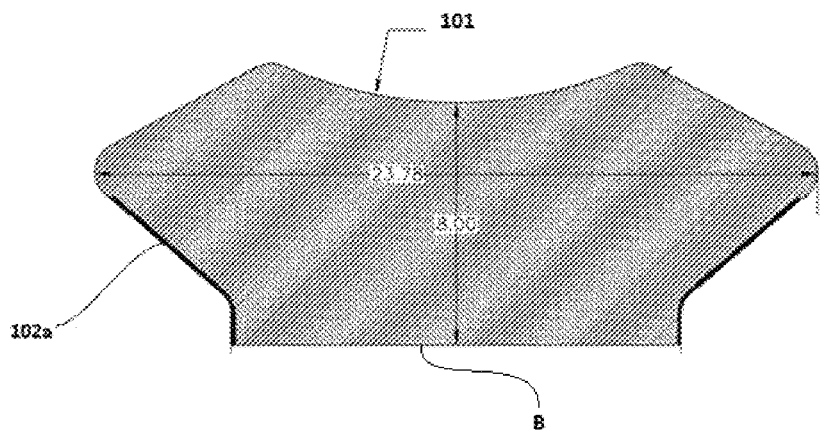
FIG. 12 is a side view of crib assembly of the jack and dolly assembly of the present invention.
Figure 13:
FIG. 13 is an alternative side view of the crib assembly of the present invention.
Figure 14:
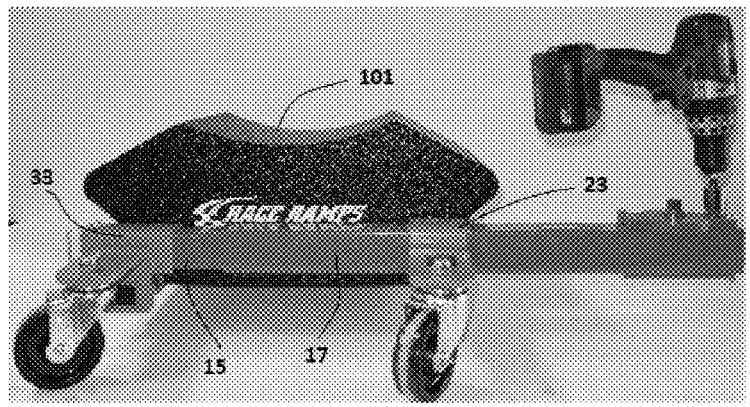
FIG. 14 is a second alternative side view of one embodiment of the jack and dolly system assembly of the present invention.
Figure 15:
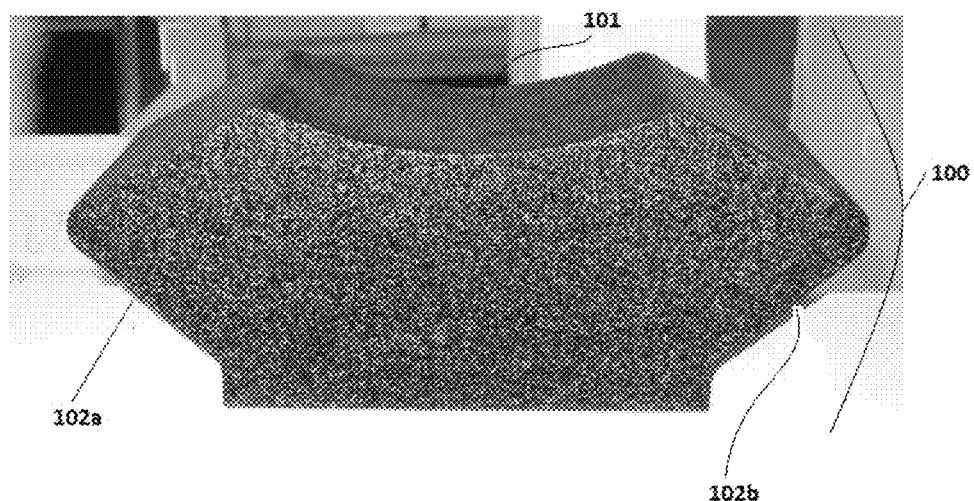
FIG. 15 is a top-side angle view of one embodiment of the crib assembly of the present invention.
Figure 16:
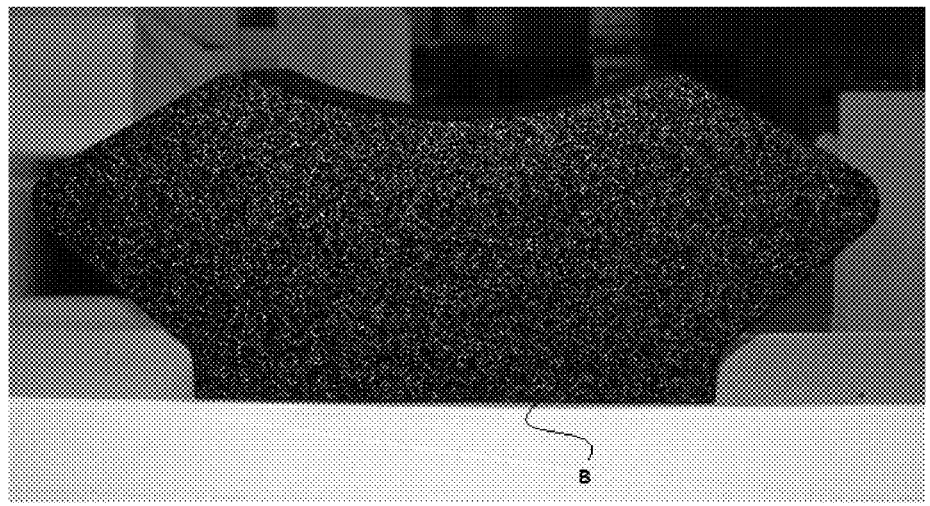
FIG. 16 is a side view of crib assembly of the present invention.

Methods of use and operation of the above described modular assembly is now described. The jack and dolly assembly is provided in a manner as described above. With reference to FIG. 11, the user is presented with the main support shaft, gear assembly, drive mechanism, and moving shaft in an assembled configuration to form the primary shaft assembly 90. A user is also presented with an assembled proximal lifting arm 22, and an assembled distal lifting arm 33.

Primary shaft 90 may lie in any orientation desired by the user. The user may place the primary shaft 90 such that the gear assembly 8 is facing up towards the user. The gear assembly may also lie to a side of the primary shaft 90, or on an angled plane as the shape of the shaft allows. The gear assembly may face the user, or may face away from the user.

As referenced above, the shaft(s) of the current invention may be chosen as desirable to the user. In the event the shaft is a square shape, the shaft may be rotated such that the gear assembly lies in any one of the four planes relative to a square tube. In the event the shaft is a tubular/round shaped, the shaft may be rotated such that the gear assembly may lie in any plane desired about the 360 possible degrees of orientation. The use and selection method for the plane/angle of which the gear assembly is laid remains as described above and applies to any shape of shaft that may be desirable. The ability to select the gear assembly's orientation allows a user to operate the jack and dolly assembly with the torque actuating means positioned away from the tire or wheel of the vehicle being lifted.

Once the desired orientation of the gear assembly is chosen and primary shaft is placed in the respective orientation, proximal arm is fit about the primary shaft by sliding the shaft through the arm's attachment means 23. Arm will slide proximally upon the shaft until stop member retains the arm in its desired location.

After placement of the proximal arm, distal arm 32 is placed upon the shaft. The attachment means of the distal arm is sized and shaped to for a fit about the distal end of the moving shaft 15. Once placed upon the shaft, distal arm is secured to the moving shaft using the means described herein.

Lifting arms must be secured about the primary shaft assembly such that each arm extends in the same direction as the other, both arms extending in a direction adjacent to the primary shaft. The placement of the arms allows for the unique modular function of the present invention to be exemplified. The arms may be placed such that they extend to the left of the primary shaft with respect to the longitudinal axis, or placed extending to the right of the primary shaft with respect to the longitudinal axis. The optional left or right placement of the arms allows for a user to be relieved of the requirement to carry multiple permanent left and right hand dolly configurations.

Once assembled in the desired orientation and position, the jack and dolly assembly is placed next to a wheel of a vehicle, the lifting arms each positioned on an opposite side of a wheel or tire. A drill, for example, is fit upon the actuation means and its drive operated with transmission switched to a first direction. This provides for the gear assembly to drive the distal lifting arm. The distal arm then moves in the direction of the proximal lifting arm, capturing the tire or wheel of a vehicle there-between and subsequently lifting it off the ground. Once the desired height is achieved, actuation is ceased and the assembly remains in a lifting position with a wheel or tire elevated thereon.

When it becomes desirable to remove the wheel or tire from the jack and dolly assembly, a torque providing tool is again fit upon the actuation means and its drive operated with transmission switched to a second direction. Second direction drive provides for a reverse movement of the distal arm, lowering the wheel or tire which was suspended upon the assembly.

It is contemplated that one or more jack and dolly assemblies may be used on a single vehicle. Preferably, the gear orientation, arm position, and placement locations of four jack and dolly assemblies is achieved. All four assemblies are placed and actuated to lift the four wheels of a vehicle. Once suspended thereon, the vehicle may be maneuvered such that it may be transported in any direction in the horizontal plane for which it rests.

It is contemplated that more than four dollies may be used for a vehicle having more than four wheels or tires.

Further embodied in FIGS. 12-19 is a crib assembly 100 having a bottom surface B. Crib assembly 100 is shaped to cradle a wheel upon its top surface 101. Alternative embodiments of the crib assembly 100 may include a top surface wherein a first end 205 is raised with respect to second end 204. Angled side panels 102a and 102b are designed to fit between lifting arms of the jack and dolly assemble, and allows the lifting arms to lift the crib assembly in the same fashion as a tire or wheel.

Crib assembly 100 is manufactured into the shape shown in FIGS. 12-16. Crib assembly is preferably manufactured from a substantially solid block of low density plastic foam. A polyurea coating is applied over the core, encasing the core while providing substantial strength to the core. For example, see U.S. Pat. No. RE41,851 E to Heinz, which is hereby incorporated by reference. The strength of the core is substantial enough to support a vehicle thereon. The coating also allows for a durable surface of the crib.

When utilized with the jack and dolly assembly, crib assembly 100 allows a vehicle to elevated and moved about in a dolly fashion described above. To use the crib assembly, a user would use a standard jack assembly to raise a vehicle off the ground. Once lifted to a height greater than the crib assembly, the crib is inserted beneath the wheel with the top surface 101 of crib 100 positioned to accept a tire. The vehicle is then lowered onto the crib and the jack is removed.

Figure 17:
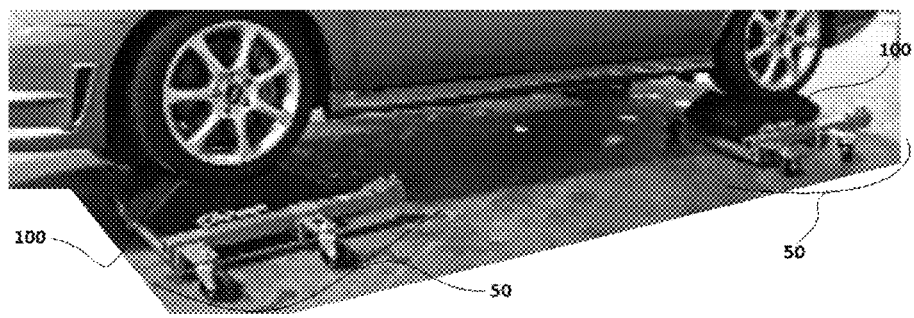
FIG. 17 is a side-angle view of one embodiment of the jack and dolly system assembly of the present invention.

The positioning of a wheel or tire upon the crib 100 is then repeated for as many tires as desired by the user. Preferably all four wheels/tires of a vehicle are positioned onto the crib assembly. Once positioning is complete, the jack and dolly assembly is operated in accordance with the above method to lift the vehicle and cribs off of the ground. When lifting onto the jack and dolly assemblies is complete, the vehicle can be moved about while enjoying additional elevation. FIG. 17 shows a vehicle rested upon crib assemblies 100, and also lifted about jack and dolly assemblies 50, such that the bottom surface B of the wheel crib does not touch the ground surface—the ground surface is in contact with the castering wheels.

Figure 18:
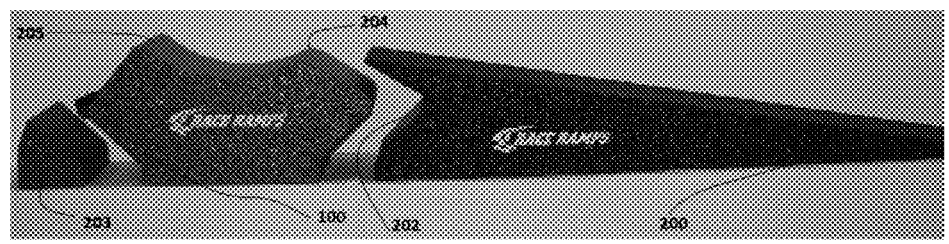
FIG. 18 is a side view of one embodiment of the jack and dolly system of the present invention.
Figure 19:
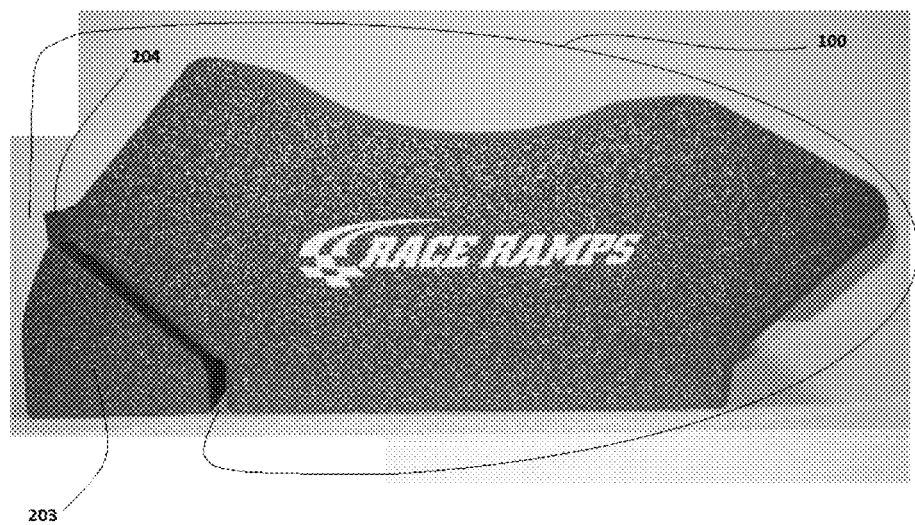
FIG. 19 is a side view of one embodiment of the jack and dolly system of the present invention.

Alternative means are contemplated for lifting a vehicle upon the crib assembly 100. As shown in FIGS. 18 and 19, such means may include the use of a removable and securable ramp 200 for driving a vehicle onto the crib assembly 100. As shown in FIG. 18, a ramp is connected and secured to a crib assembly. Ramp embodies means for interacting 202 with the crib assembly. A chock means 203 is also provided, providing for added securement of crib and ramp and further preventing movement of the crib 100 in a direction away from the ramp 200. In alternative embodiments, crib assembly 100 includes a tail means 204 configured to grab and hold chock means 203. Ramp and chock means are preferably assembled from the same materials as the crib assembly described above.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A jack and dolly system comprising:
   an outer shaft defining a longitudinal axis extending along the shaft and an interior hollow;
   a reversible drive mechanism at least partially positioned in the interior hollow of the outer shaft;
   a moving shaft coupled to the drive mechanism and dimensioned to movably fit within the outer shaft;
   a proximal arm removably securable to the outer shaft and substantially perpendicular to the longitudinal axis;
   a distal arm removably securable to the moving shaft, the distal arm being spaced from and substantially parallel to the proximal arm;
   a wheel crib positionable between and upon the proximal and distal arms;
   wherein the reversible drive mechanism is operable to move the distal arm along the moving shaft in a direction away from and towards the proximal arm.

2. The assembly of claim 1 wherein the drive mechanism comprises at least one acme screw and at least one drive gear coupled to the at least one acme screw.

3. The assembly of claim 2 wherein the drive gear is operable at one of a high speed and a low speed.

4. The assembly of claim 1 wherein at least one of the proximal and distal arms includes a roller.

5. The assembly of claim 1 wherein at least one of the proximal and distal arms includes a castering wheel.

6. The assembly of claim 1 wherein at least one of the proximal or distal arms comprises an elongated center portion disposed between a first mounting plate and a second mounting plate.

7. The assembly of claim 6 wherein the first and second mounting plates each have a support mounting surface and a center mounting surface, the center mounting surface being approximately perpendicular to the support mounting surface.

8. The assembly of claim 7 wherein the elongated center portion comprises a first end and a second end, the second end being affixed to the center mounting surface of the second mounting plate, and the first end being removably securable to the center mounting surface of the first mounting plate.

9. The assembly of claim 8 wherein a hollow securing portion is affixed to the center mounting surface of the first mounting plate.

10. The assembly of claim 6 wherein the elongated center portion comprises one or more raceways, the raceways encircling the elongated center portion.

11. The assembly of claim 10 wherein a roller sleeve is disposed over the raceways and about the elongated center portion.

12. The assembly of claim 6 wherein a castering wheel is affixed to the support mounting surface of the first mounting plate, and a castering wheel is affixed to the support surface of the second mounting plate.

13. The assembly of claim 1 wherein the proximal and distal arms are removably secured in a right side configuration with respect to the longitudinal axis of the outer shaft.

14. The assembly of claim 1 wherein the proximal and distal arms are removably secured in a left side configuration with respect to the longitudinal axis of the outer shaft.

15. The assembly of claim 1 further comprising a translation limiting mechanism removably securable to the outer shaft, wherein the limiting mechanism interacts with the proximal arm.

16. A jack and dolly assembly comprising:
- an outer shaft defining a longitudinal axis extending along the shaft and further defining an interior hollow;
- a reversible drive mechanism at least partially positioned in the interior hollow of the outer shaft;
- a moving shaft coupled to the drive mechanism and dimensioned to movably fit within the outer shaft;
- a proximal arm removably securable to the outer shaft and substantially perpendicular to the longitudinal axis;
- a distal arm removably securable to the moving shaft, the distal arm being spaced from and substantially parallel to the proximal arm; and
- a wheel crib positionable between and upon the proximal arm and the distal arm;
- wherein at least one of the proximal or distal arms comprises an elongated center portion having a first end and a second end and disposed between a first mounting plate and a second mounting plate, the first and second mounting plate each having a support mounting surface and a center mounting surface, the second end being affixed to the center mounting surface of the second mounting plate, and the first end being removably securable to the center mounting surface of the first mounting plate, and a hollow securing portion affixed to the center mounting surface of the first mounting plate;
- wherein the reversible drive mechanism is operable to move the distal arm along the moving shaft.

17. The assembly of claim 16 wherein the wheel crib comprises a core having a top surface comprising a concave central portion.

18. The assembly of claim 17 wherein the distal arm is movably engaged with a first side surface of the wheel crib and the proximal arm is movably engaged with a second side surface of the wheel crib.

19. The assembly of claim 18 wherein a bottom surface of the wheel crib is spaced from a ground surface of an environment in which the wheel crib is used.

20. The assembly of claim 17 further comprising a ramp having a bottom surface, a sloped front surface, and a back surface, wherein the back surface is securably engageable with a side surface of the wheel crib.

21. The assembly of claim 17 further comprising a chock, wherein the chock is secureably engageable with a side surface of the wheel crib.

* * * * *